July 15, 1952     M. MANN     2,603,149

IMPRINTING MACHINE FOR CHINA

Filed July 31, 1946     7 Sheets-Sheet 1

Fig.1

Inventor
Martin Mann
by Parker & Carter
Attorneys

July 15, 1952 M. MANN 2,603,149
IMPRINTING MACHINE FOR CHINA
Filed July 31, 1946 7 Sheets-Sheet 2
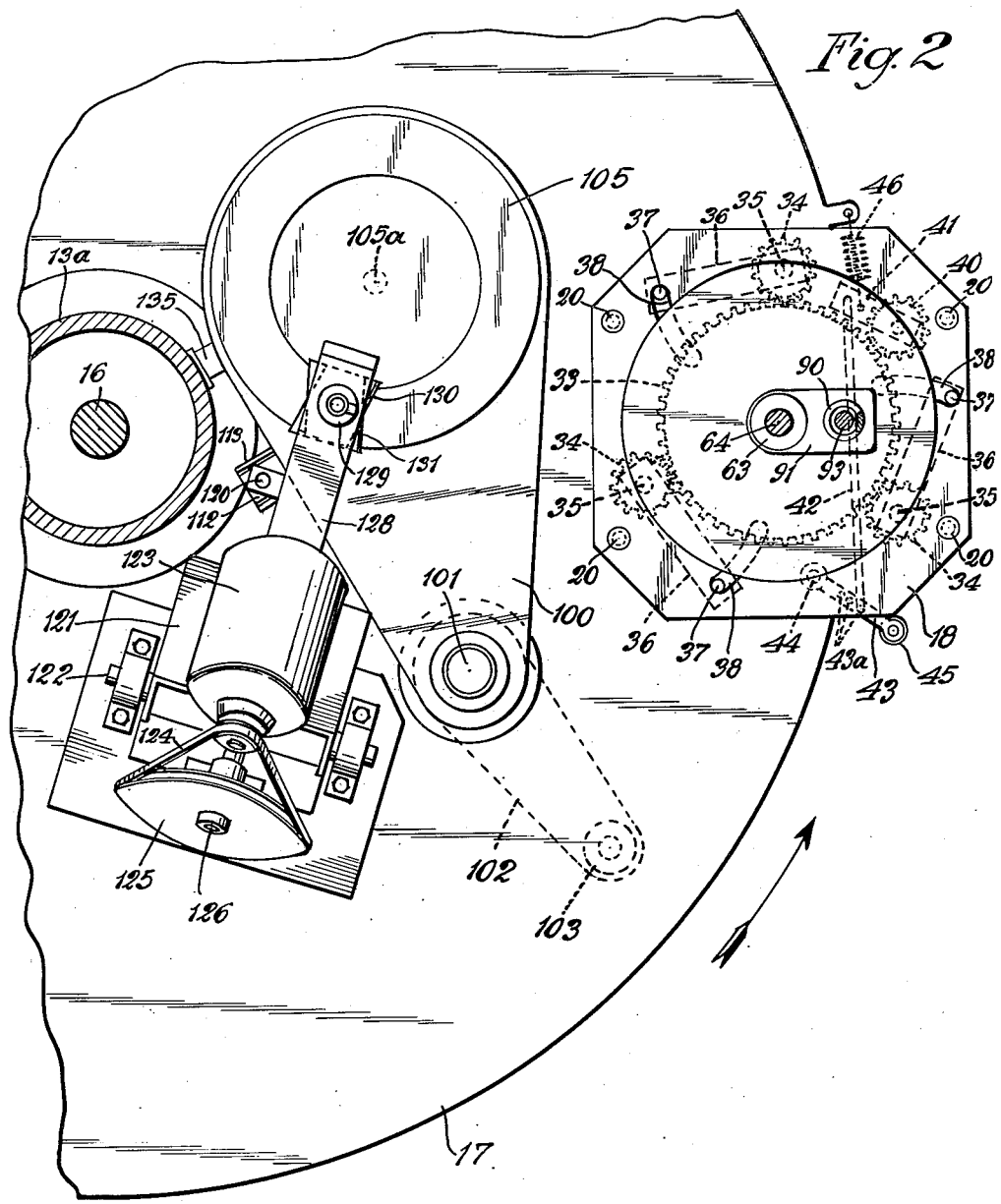
Fig. 2
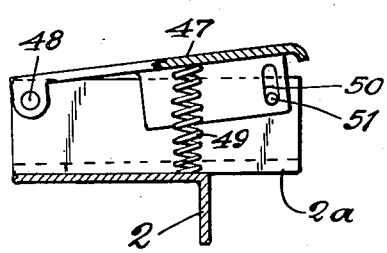
Inventor
Martin Mann
by Parker & Carter
Attorneys

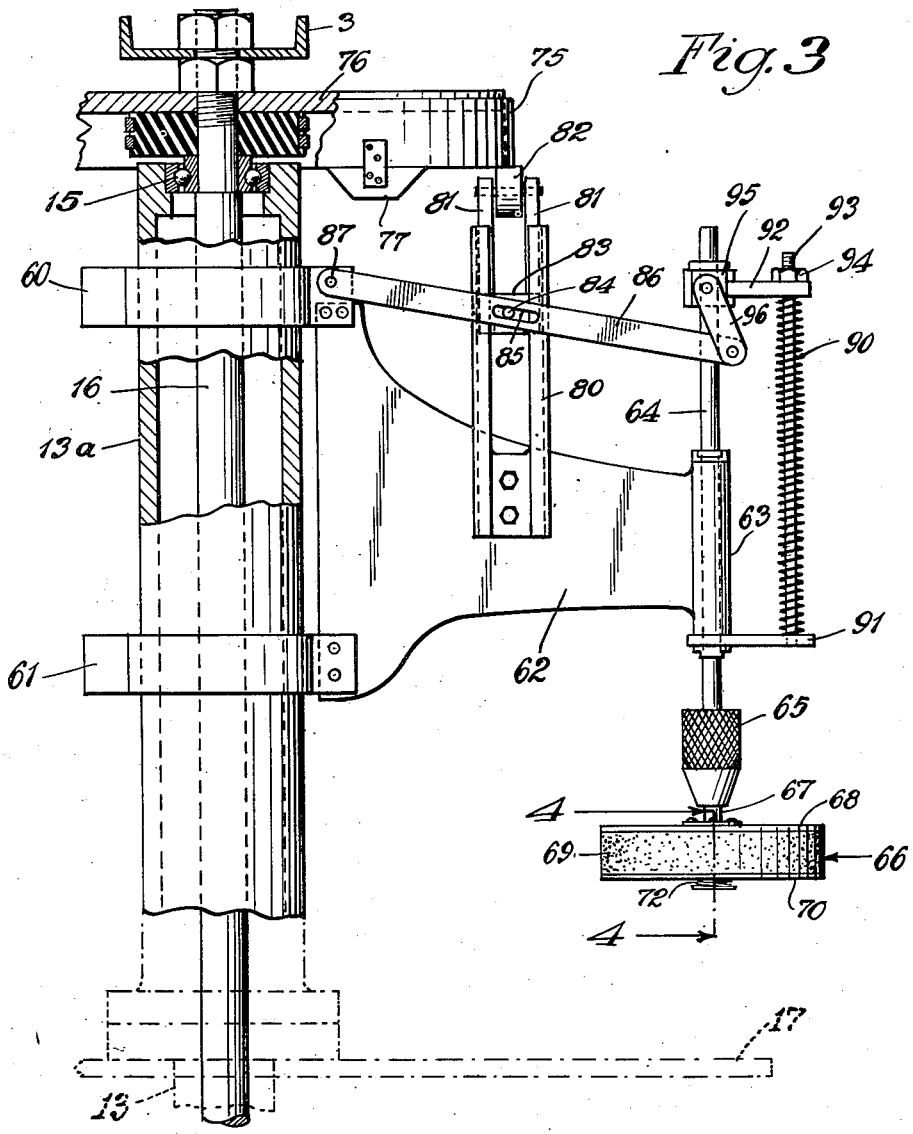

July 15, 1952 M. MANN 2,603,149
IMPRINTING MACHINE FOR CHINA
Filed July 31, 1946 7 Sheets-Sheet 4
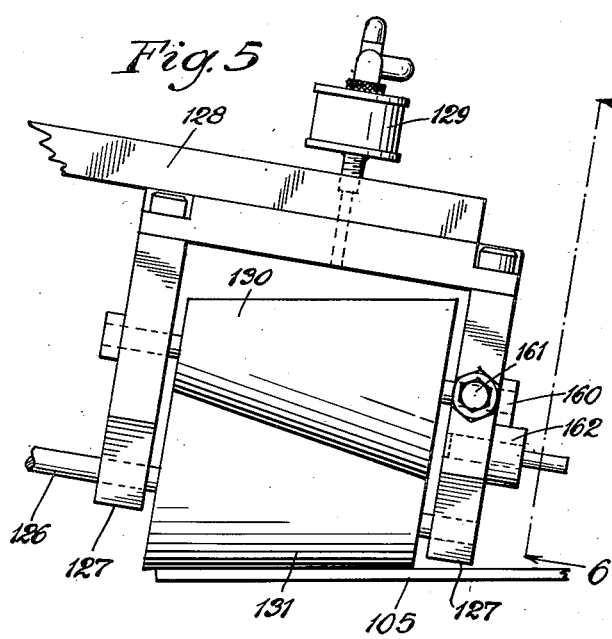
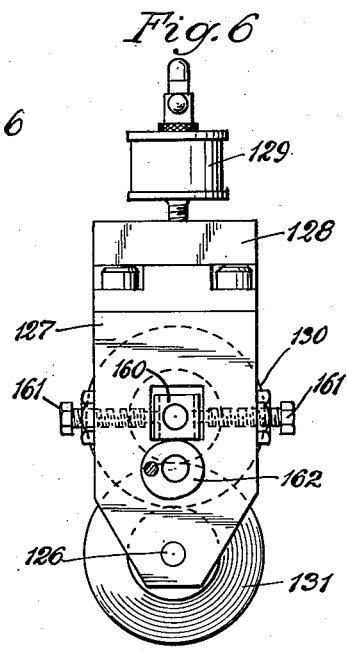
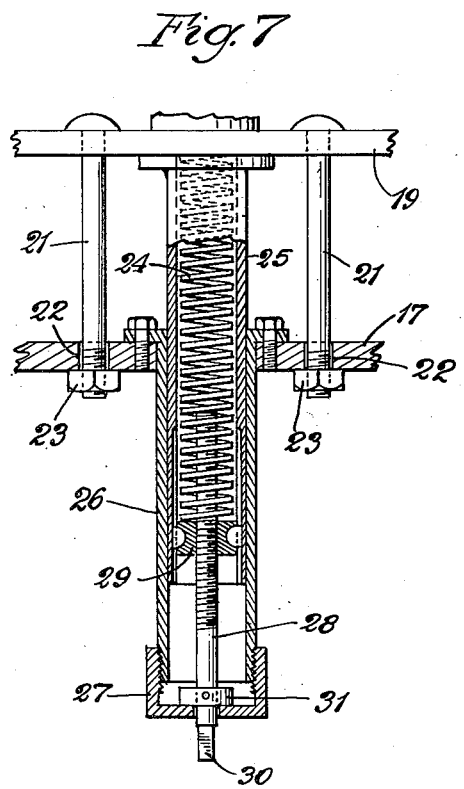
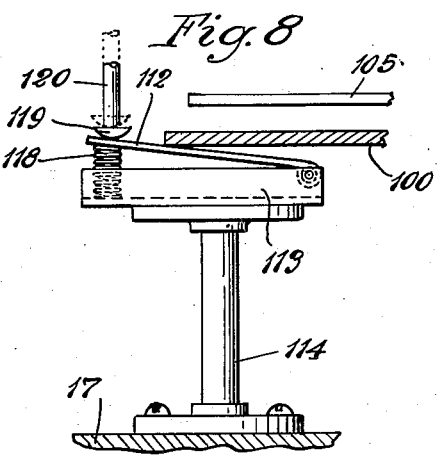
Inventor
Martin Mann
by Parker & Carter
Attorneys July 15, 1952 — M. MANN — 2,603,149
IMPRINTING MACHINE FOR CHINA
Filed July 31, 1946 — 7 Sheets-Sheet 5

Inventor
Martin Mann
by Parker & Carter
Attorneys

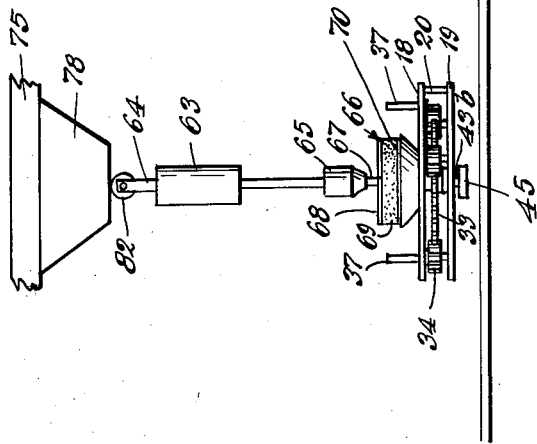

July 15, 1952   M. MANN   2,603,149
IMPRINTING MACHINE FOR CHINA
Filed July 31, 1946   7 Sheets-Sheet 7

Inventor
Martin Mann
by Parker & Carter
Attorneys

Patented July 15, 1952

2,603,149

UNITED STATES PATENT OFFICE 2,603,149

IMPRINTING MACHINE FOR CHINA

Martin Mann, Chicago, Ill., assignor to Stetson China Company, Chicago, Ill., a corporation of Illinois Application July 31, 1946, Serial No. 687,506

6 Claims. (Cl. 101—41)

My invention relates to an improvement in stamping or impressing devices, and has for one purpose to provide an improved means of and method for applying ink, pigments and the like to china and pottery.

Another purpose is to provide an improved method of and means for handling china, pottery and the like, while applying designs or surface treatment thereto.

Another purpose is to provide improved inking or pigment supplying means for such a device.

Another purpose is to provide improved driving and operating means for such a device.

Other purposes will appear from time to time in the course of the specification and claims.

The invention is illustrated more or less diagrammatically in the accompanying drawings wherein:

Figure 1 is a side elevation;

Figure 2 is a section on an enlarged scale on the line 2—2 of Figure 1;

Figure 3 is a view on the line 3—3 of Figure 1;

Figure 4 is a section on an enlarged scale on the line 4—4 of Figure 3;

Figure 5 is a partial side elevation of the inking or pigment applying assembly;

Figure 6 is a view on the line 6—6 of Figure 5;

Figure 7 is a section on the line 7—7 of Figure 1;

Figure 8 is a detail;

Figure 9 and Figure 10 illustrate, respectively and schematically, a side elevation and a plane view of a portion of the mechanism in the initial stage or the final stage of handling a plate, dish or the like.

Figures 13 and 14 are similar schematic views illustrating the corresponding parts with the dish centered;

Figures 15 and 16 are a similar pair of schematic views, respectively in elevation and plane, illustrating the dish at the time it receives the stamp;

Like parts are indicated by like symbols throughout the specification and drawings.

Figure 12:
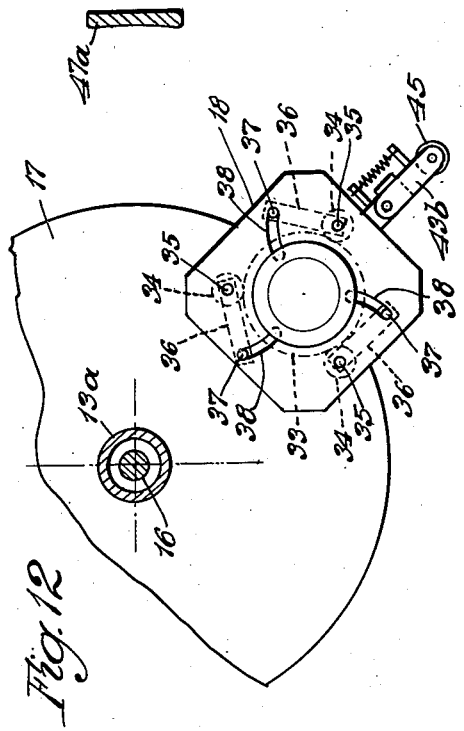
Figure 10:
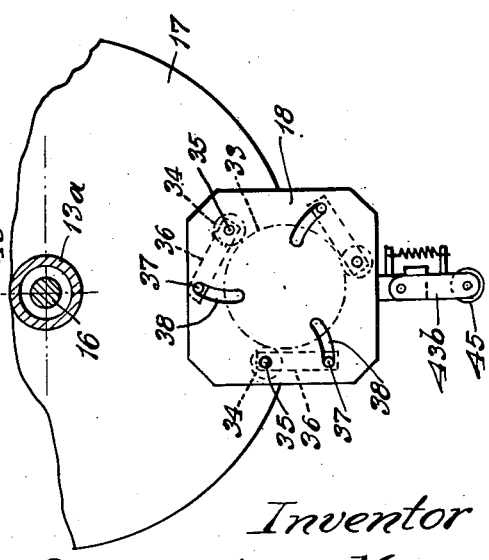
Figure 19:
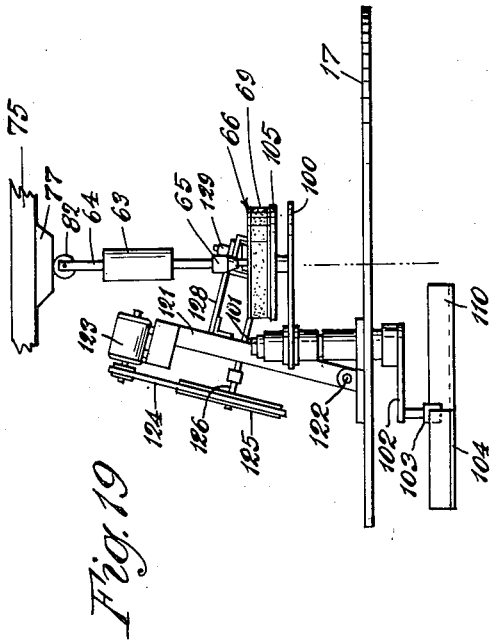
Figures 19 and 20 are similar schematic drawings, respectively in side elevation and plane view, illustrating the inking of the stamp.

Referring to the drawing, A indicates any frame supported on the base 1, which may include the vertical components 2, a top transverse frame 3, bottom transverse members 4, and a central pedestal or support 5. 6 generally indicates any suitable motor which, through a belt 7, drives a pulley 8 associated with any suitable gear reduction, not shown in detail but generally indicated as 9. Extending from the gear reduction 9 is the shaft 10 carrying a pinion 11 in mesh with a gear 12 on a sleeve 13 supported in any suitable end thrust ball bearing assembly 14. A centering assembly 15 is shown in Figure 3, for the top of the sleeve 13a. 16 indicates any suitable centering shaft. Rotated with the sleeve 13a is any suitable table 17, shown as having a circular edge. Mounted on the table 17, for rotation unitarily therewith but adapted for vertical movement in relation thereto, is the work receiving assembly which includes the work support proper 18. Positioned below the support 18 is another member 19. The two members are separated by supporting spacers 20. The lower member 19 is provided with limit members 21 which pass through apertures 22 in the table 17. They are provided with adjustable limiting abutments or nuts 23. It will be understood that the coil spring 24 is adapted normally to urge the work support 18 with its associate member 19 upwardly as far as the limits 23 will permit. The spring 24 is surrounded by a movable or telescopic sleeve 25 which is secured to the plate 19. It slides in a fixed outer sleeve 26 provided with a removable head 27 which receives the outer end of the adjusting screw 28, along which the lower spring abutment 29 may be adjusted. The member 29 is suitably held against rotation and is in screw threaded relation with the stem 28. Thus as the screw 28 is rotated by applying a tool to the squared outer end 30 the compression of the spring 24 may be adjusted. 31 is any suitable abutment on the member 28, which engages the cap 27. It will thus be understood that the work support 18 is normally held in elevated position in relation to the table 17. Mounted between the plates 18 and 19 is a gear 33 in mesh with a plurality of pinions 34, each of which is pivoted as at 35 and carries a lever arm 36 with an upwardly projecting member 37 passing through an aperture 38 in the support 18. The apertures or slots 38 are of sufficient length to permit a predetermined arc of movement of each of the levers 36, as will be clear from the diagrams Figures 10, 12, etc. Movement is imparted to the gear 33 by a drive pinion 40 which has an arm 41 to which is secured an actuating link 42 which extends to a lever 43 pivoted as at 44 to the table 17. It carries at its outer end a cam engaging roller 45. It will be understood that the link 42 may be adjusted on the levers 41 or 43. For example, I illustrate a plurality of apertures 43a on the lever 43. A spring 46 is effective normally to return the gear 33 to initial position, at which position the centering pins 37 are at the outward limit of their possible movement in the slots 38. As shown, for example, at the bottom of Figure 2, an actuating cam is provided, which is adapted to engage the roller 45 in response to the rotation of the table 17 in the direction of the arrow of Figure 2. The cam may, for example, include a support or angle 2a, secured to the side frame member 2. The cam proper 47 is pivoted to the member 2a, as at 48. It is normally held in the position in which it is shown in Figure 2 by the compressed coil spring 49. Its possible movement is limited by a slot 50 which receives a pin 51. The spring 49 holds the members 47 in proper position to cam the roller 45 and cause a rotation of the pinion 40, which drives the gear 33 and the pinions 34 in such fashion as to move the centering pins 37 toward the center of the work support plate 18. However, the spring 49 gives yielding relief, so that the roller 45 may override the cam 47. It will be understood that the inward movement of the centering pins 37 is limited by the circumferential edge of whatever plate or work is being treated. Since there may be a variation in size of the work, the spring 49 serves as a self-adjusting spring release for the centering mechanism above described.

The upper sleeve portion 13a, which surrounds the rod 16 above the table 17, has surrounding collars 60, 61, to which are secured a bracket 62 having at its outer end a sleeve 63. Slidable in the sleeve 63 is the rod 64 carrying at its lower end a chuck 65, in which the stamp 66 may be removably mounted. The stamp includes a pin 67, a top plate 68 secured thereto, and an annulus 69, of sponge rubber or the like. It carries a lower printing or stamping surface 70, carrying any suitable stamping or impressing elements 71, of rubber or the like. 72 is a coil spring, fastened to the top plate 68.

The stamp 66 is vertically reciprocated through excursions of two different lengths, a short inking excursion, and a long printing excursion. The two excursions are caused by the following structure: 75 is a cam supporting ring associated with any suitable top plate 76 at the upper end of the rod or shaft 16. The ring 75 carries a small cam or cams 77 and a large cam or cams 78. If but a single stamping or inking excursion is to be made at each rotation of the table 17, then but a single cam of each size need be used. The arm 62 carries a guide track 80 in which is slidable any suitable cross-head or guided structure 81 carrying a cam engaging roller 82 at its upper end. The cross-head 81 includes a lower portion 83, provided with an outwardly extending pin or pins 84, extending into a slot or slots 85 in the lever or fork structure 86, pivoted as at 87 to the upper collar 60. It will thus be understood that when the roller 82 engages one of the cams 77 or 78 the cross-head portion 83 is depressed, thereby rotating the lever or yoke 86 downwardly about its center 87. The roller 82 is normally yieldingly upwardly thrust against the track 75 by suitable yielding means. I illustrate, for example, the compressed coil spring 90, the lower abutment for which is the bracket 91 at the bottom of the sleeve 63. The upper end of the spring 90 engages the movable upper abutment 92, guided on any suitable pin 93, and limited in its upward movement by the stop 94. The pin 93 also serves as centering means for the spring 90. The top abutment 92 is secured to the head 95 which moves unitarily with the pin or rod 64. The head 95 is also connected by the link 96 to the outer end of the yoke or lever 86. Thus the stamp 66 is normally held in its elevated position, in which it is shown in Figure 3, but is given a minimum downward movement by the cam 77 and a maximum downward movement by the cam 78.

In order to ink the stamp, or to supply to it whatever pigment or material is to be applied, I employ the following structure: 100 indicates an inking ring support, pivoted as at 101. Any suitable means may be employed for imparting to it a rotary oscillation about the center 101. I illustrate, for example, an actuating cam lever 102 which is located below the table 17. It has an end cam roller 103 which is adapted to engage any suitable actuating cam 104, in response to the rotation of the table 17. Such rotation causes the arm 100 to rotate from the position in which it is shown in Figure 2 or in Figure 18, into a position in which its outer end overlies the work support 18, as shown, for example, in Figure 20. It will be noted that the lever 100 is shown as having a flat inking or pigment receiving annulus or disc 105.

Figure 11:
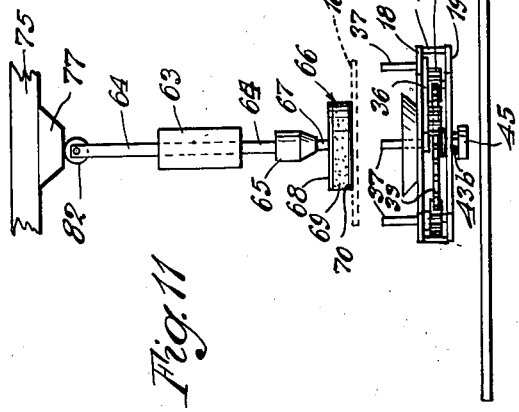
Figures 11 and 12 are similar views illustrating, respectively and schematically, a side elevation and a plan view of the corresponding parts at the inking or pigment receiving station of the impressing stamp.
Figure 20:
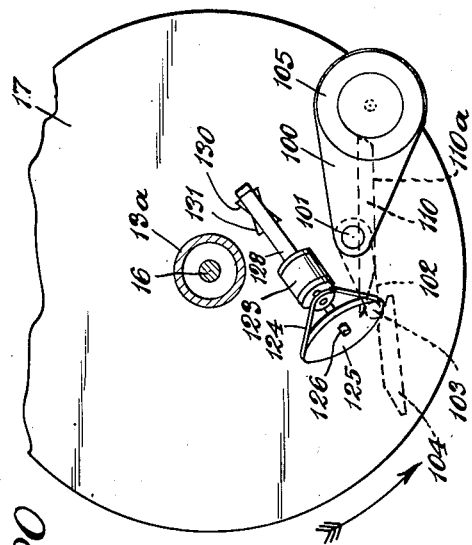
Figure 18:
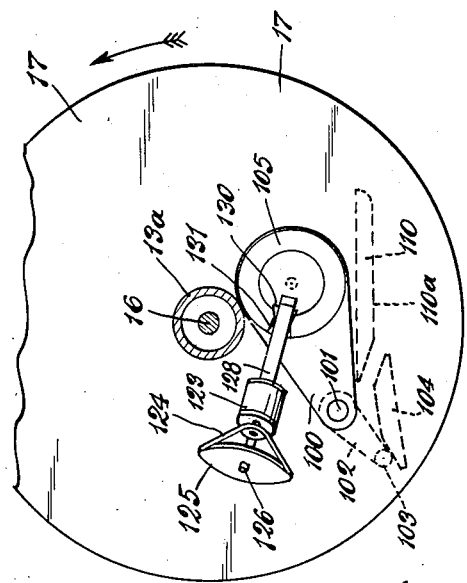

Assuming that the cam 104, in response to the rotation of the table 17 from the position of Figure 18 to the position of Figure 20 has moved the arm 100 to the position in which it is shown in Figure 20, the parts are so proportionate that the stamp 66 is moved downwardly against the disc 105. This is the position in which it is shown in Figure 11. It will be understood that Figures 11, 12, 19 and 20 all show the various parts at that particular stage of operation, in which the smaller cam 77 has moved the stamp 66 downwardly against the annulus or disc 105, the cam 104 having at the same time been effective to move the disc 105 into the position in which it is shown in Figure 20. For a short period of rotation of the table 17, the cam roller 103 is not affected by the cam 104 or by the following cam 110. However, as the rotation of the table 17 continues in the direction of the arrows of Figure 20, the cam roller 103 strikes the plane outer surface 110a of the cam 110 and the result is a return movement of the arm 100 to its initial position as shown in Figure 18. Thereafter, as the rotation of the table 17 continues, the roller 82 reaches the larger cam 78, and a stamping excursion ensues, in the course of which the stamp 66 strikes the already centered work. Meanwhile the arm 100, when it returns to its initial inward position, moves against a yielding cam 112 which is hinged to a fixed member 113 on any suitable pedestal 114 on the table 17. The spring 118 normally holds the member 112 in elevated position. It also serves slightly to elevate the abutment 119 on a rod or stem 120 which is secured to the hinged bracket 121, which is hinged or pivoted as at 122 to the table 17. The bracket carries at its upper end a motor 123, which through a belt 124 drives a pulley 125 on a shaft 126. The opposite end of the shaft 126 is journaled in bearings 127 supported on a lateral extension 128 of the bracket 121. 129 is any suitable inking or pigment reservoir which feeds to a conic driven roller 130. The roller 130 engages an upper part of the oppositely conic roller 131 on and driven by the shaft 126. It will be understood that the annulus or disc 105 is free to rotate about its center 105a at the outer end of the arm 100. When the arm 100 reaches the position in which it is shown in Figures 2 and 18 the edge of the arm runs over the yielding cam 112, as shown in Figure 8. The result is a depression of the member 112, which permits the abutment 119 to drop. The result is to permit the bracket 121 to rotate slightly, clockwise, about its axis 122. Thereby, the roller 131 engages the upper surface of the disc or annulus 105. The roller 131 rotates and imparts rotation to the annulus 105, thus distributing the pigment. It receives pigment from the upper conic roller 130 and applies it to the upper surface of the annulus 105. Any suitable stop 135 may be employed to limit the inward movement of the arm 100. When the roller 103 next engages the cam 104, it is already inked and ready to ink the stamp 66, at the next inking excursion of the stamp.

Whereas in Figures 1 and 2 I illustrate a yieldingly thrust cam 47, for actuating the work centering means, I illustrate in the diagram Figures 14 and 16 a fixed cam 47a, with a yielding actuating arm 43b. In other words, it is immaterial whether the yielding take-up of the invention is applied to the cam or to the mechanism actuated by the cam. It will be understood that any suitable adjusting means may be employed.

I illustrate, for example, means for adjusting the axis of the ink transmitting roller 130. I illustrate a journal box 160 which may be laterally adjusted by any suitable adjusting screws 161 and may be vertically adjusted by any suitable eccentric 162.

It will be understood that whereas in the claims I may employ the terms "printing" or "ink" or "inking" that I wish these terms to be taken as sufficiently broad to cover any modification of the surface of the work, whether by slightly changing its contour, or by applying thereto any visible ink, pigment, gilt, or any other such substance.

It will be realized that whereas I have described and shown an operative device nevertheless many changes may be made in size, shape, number and disposition of parts without departing from the spirit of the invention.

The use and operation of the invention mentioned are as follows:

My invention is applicable to means for applying color, gold, pigment and the like, to work to be stamped. A usual and useful application is to stamping ceramic materials, such as china and pottery, but other materials may be employed. It is applicable, for example, to operating on plates or discs of wood, metal and other materials.

The working table 17 is rotated, relatively slowly, in a uniform direction of rotation. It may be operated step by step, with intervening pauses, but I find it convenient to employ a uniform and fairly slow rate of rotation. Where the device is operated manually, and without automatic feeding means, the operator puts the work plate or the like, on the work support 18 and, after it has been stamped, removes it. It will be understood, however, that my invention may efficiently be operated with any suitable automatic work feeding and work removing means.

Assuming that the device is being operated with a manual feed, the operator, who may take a predetermined station, puts the work on the work support 18, which is thereafter rotated about its course by the usual rotation of the table 17. In the course of such rotation it receives the impression of the stamp 66, and is returned toward the operator's station. The operator removes the stamped work, and applies an unstamped piece of work. Under certain circumstances it may be advantageous to permit the work to adhere to the stamp, as the stamp rises from the stamping operation. In that event the completed work may be removed, manually or mechanically, and a new piece of work applied to the work support 18. However, I find it advantageous to employ a spring 72 to prevent the work from adhering to the stamp, as any breakage by unintended dropping of the work adhering to the stamp shall thereby be prevented.

Figure 9:
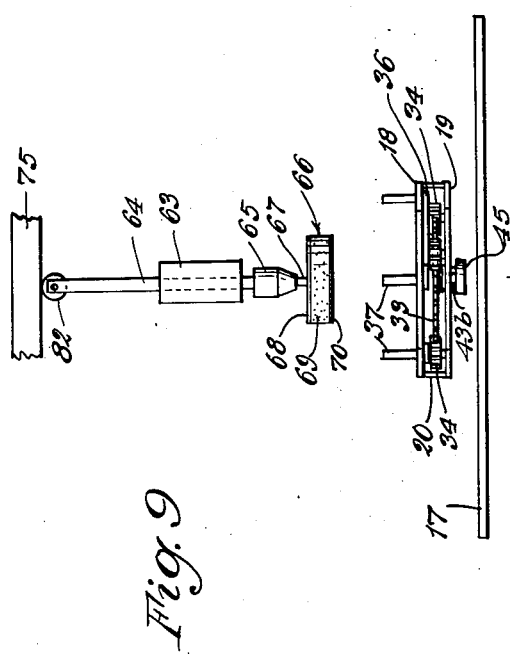
Figure 17:
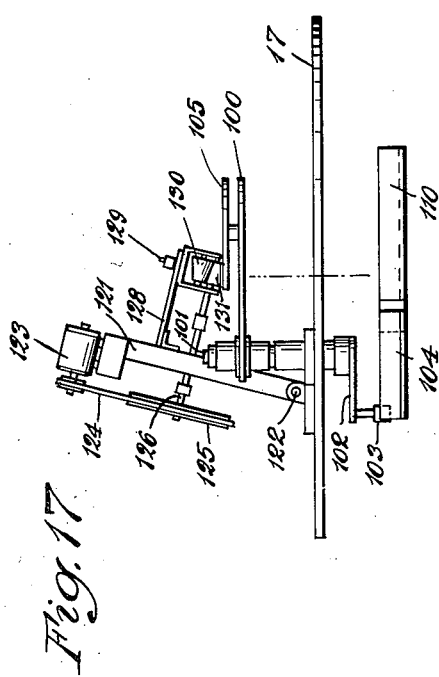
Figures 17 and 18 are a pair of schematic drawings, respectively in side elevation and plane view, illustrating the inking mechanism at the unload or load position, when the work is not actually receiving the stamp.

In the normal cycle of operation, after the work has been applied to the work support 18, the cam 47 is engaged by the cam roller 45, and the centering pins 37 are moved inwardly towards the center of the support 18, thus centering the work in relation to the center of the stamp 66. The stamp 66 at each rotation of the table 17, makes a relatively short downward ink receiving excursion, caused by the cam 77, and a relatively long downward ink imparting excursion, caused by the cam 78. The parts are so proportionate and related that, at the time the stamp 66 makes its downward ink receiving excursion the annulus or disc 104 has already been inked by the roller 131, and has been moved outwardly by the cam 104 to the position of Figure 20. The stamp then moves to the position in which it is shown in Figure 11, in contact with the inked annulus 105. Thereafter the stamp recedes upwardly, and the cam 119 is effective to move the arm 100 back to the position in which it is shown in Figure 18. The annulus or disc 105, as shown, for example, in Figure 17, then receives its inking, and is prepared for the next inking excursion of the stamp. But meanwhile the stamp, downwardly moved by the engagement of the roller 82 with the cam 78, moves to the fully depressed or ink imparting position of Figure 15, and stamps the work. After the stamp 66 has receded, for example, to the position in which it is shown in Figures 9 and 13, then the operator can remove the completed work and set a new piece.

In the present showing I illustrate but a single work support 18 on the table 17. It is possible and practical to employ more than one work support on a single table. For example, the size of the table may be increased, and its rotation rate reduced, and the parts shown herein may be duplicated, with two sets of supports and corresponding multiple cams 77 and 78.

I claim:

1. In a device for printing china and the like, a base, a table mounted on said base for rotation about a vertical axis, a work holding device mounted eccentrically on said table for rotation with said table, work centering members movably associated with said work holding device, a stamping assembly mounted eccentrically on said table for rotation with said table and including a work engaging stamp vertically aligned with the work holding device, a driving connection for said rotary table adapted to rotate it about its axis, a drive assembly for moving said centering members toward work positioned on said work holding device, and an actuating connection for imparting relative vertical movement to said stamp and work support during rotation of said table, an inking member for said stamp, mounted on said table for rotation about a vertical axis for swinging movement into or out of position between said stamp and said work holding device, the actuating connection for said stamp including a member adapted to move said stamp downwardly a sufficient distance to engage said inking member and another member adapted to move said stamp downwardly a greater distance sufficient to bring it into contact with the work, and an actuating connection for said inking member formed and adapted to move it into and out of operative position below said stamp.

2. In a device for printing china and the like, a base, a table mounted on said base for rotation about a vertical axis, a work holding device mounted eccentrically on said table for rotation with said table, work centering members movably associated with said work holding device, a stamping assembly mounted eccentrically on said table for rotation with said table and including a work engaging stamp vertically aligned with the work holding device, a driving connection for said rotary table adapted to rotate it about its axis, a drive assembly for moving said centering members toward work positioned on said work holding device, and an actuating connection for imparting relative vertical movement to said stamp and work support during rotation of said table, an inking member mounted on said table for movement into and out of alignment with said stamp, the actuating connection for the stamp including a plurality of cams of different effective height, one of said cams being formed and adapted to engage said actuating connection and to impart a downward movement of the stamp of sufficient distance to bring it into contact with the work, another cam being of a height effective to impart to said stamp, through said actuating connection, a shortened downward excursion sufficient only to move the stamp into contact with the inking member when the inking member is between the working support and stamp.

3. In a device for printing china and the like, a base, a table mounted on said base for rotation about a vertical axis, a central column upwardly extending from said table, a fixed support upwardly extending through said column, a circumferential cam track mounted on said fixed support, concentric with the axis of rotation of said table and said central column, an arm radially extending from said column, a stamp guided for vertical movement on said arm, an actuating connection for said stamp including a member riding along said cam track, a plurality of cams of different height on said cam track formed and adapted to impart to said stamp a relatively short and a relatively long downward excursion, a work holding device mounted eccentrically on said table for rotation with said table, and vertically aligned beneath said stamp, work centering members movably supported on said table in association with said work holding device, a cam fixed in relation to said base, and an actuating connection for said work centering members including an actuating member formed and adapted to engage said last mentioned cam in response to rotation of said work holding device with said table, an inking member mounted on said table and an actuating connection for said inking member formed and adapted to move the inking member into alignment with the stamp at the time of the relatively short downward excursion of the stamp.

4. In a device for printing china and the like, a rotary base and means for rotating it, a work support mounted on and movable with said base, a stamp mounted on said base and movable vertically in relation thereto, said stamp being vertically aligned with said work support, an inking member mounted on the base for rotation therewith, means for intermittently moving said inking member into and out of a position in alignment with said stamp and work support, ink supply means mounted upon the base for rotation therewith, and means for intermittently moving the ink supply means into operative contact with the inking member when the latter is out of alignment with the stamp and work support, means for moving said stamp downwardly against said inking member when the inking member is between the stamp and the work support, and for thereafter moving the stamp downwardly against the work when the inking member is out of alignment with the work support.

5. The structure described in claim 4 wherein said ink supply means includes an arm mounted on the rotary base for oscillation about a horizontal axis, an ink applicator carried by the arm, and means operative in response to rotation of the base for intermittently moving the arm about said axis to bring the applicator into contact with the inking member.

6. In a device for printing china and the like, a base member, a table mounted on the base for rotation about a vertical axis, a work holding device mounted eccentrically on said table for rotation with the table, work centering members movably associated with said work holding device, a stamping assembly mounted eccentrically on said table for rotation with said table and including a work engaging stamp vertically aligned with the work holding device, inking mechanism mounted on the table and including an ink supply member and an inking member, means operative in response to the rotation of the table for intermittently moving the ink supply member into contact with the inking member and for moving the inking member intermittently into and out of alignment with the stamp, a driving connection for said rotary table adapted to rotate it about its axis, a drive assembly for moving said centering means towards work position on said work holding device, and an actuating connection for imparting relative vertical movement to the stamp and inking member when the stamp and inking member are aligned and an actuating connection for imparting relative vertical movement to the stamp and work support to bring the stamp into printing contact with the work when the inking member is out of alignment with the stamp, said actuating connections being operative in response to rotation of said table.

MARTIN MANN.

REFERENCES CITED

The following references are of record in the file of this patent:

UNITED STATES PATENTS

| Number | Name | Date |
|---|---|---|
| 834,181 | Bell | Oct. 23, 1906 |
| 884,031 | Mountford | Apr. 7, 1908 |
| 966,481 | Silverman | Aug. 9, 1910 |
| 1,420,187 | Douglas | June 20, 1922 |
| 1,960,486 | Freeman | May 29, 1934 |
| 2,335,213 | Lawrence | Nov. 23, 1943 |
| 2,335,840 | Hebenstreit | Nov. 30, 1943 |
| 2,372,089 | Keller | Mar. 20, 1945 |
| 2,425,928 | Emerson | Aug. 19, 1947 |